(12) United States Patent
Magno, Jr. et al.

(10) Patent No.: US 7,017,237 B2
(45) Date of Patent: Mar. 28, 2006

(54) HIGH PERFORMANCE CABLE TIE

(75) Inventors: Joey D. Magno, Jr., Cordova, TN (US); Xueming Cai, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 10/726,090

(22) Filed: Dec. 2, 2003

(65) Prior Publication Data

US 2005/0115029 A1 Jun. 2, 2005

(51) Int. Cl.
*B65D 63/10* (2006.01)
(52) U.S. Cl. .................................. 24/16 PB
(58) Field of Classification Search ............. 24/16 PB, 24/17 AD, 30.5 P; 248/74.3
See application file for complete search history.

(56) References Cited

U.S. PATENT DOCUMENTS

| | | | |
|---|---|---|---|
| 3,588,962 A * | 6/1971 | Feldberg | 24/16 PB |
| 3,887,965 A * | 6/1975 | Schuplin | 24/16 PB |
| 3,900,923 A | 8/1975 | Thomas, et al. | |
| 3,973,292 A * | 8/1976 | Bonnet | 24/16 PB |
| 3,983,603 A | 10/1976 | Joyce | |
| 3,991,444 A | 11/1976 | Bailey | |
| 4,001,898 A | 1/1977 | Caveney | |
| 4,003,106 A | 1/1977 | Schumacher et al. | |
| 4,135,749 A | 1/1979 | Caveney et al. | |
| 4,136,148 A | 1/1979 | Joyce | |
| 4,137,606 A * | 2/1979 | Wood | 24/16 PB |
| RE31,541 E | 3/1984 | Wood | |
| 4,473,524 A | 9/1984 | Paradis | |
| RE31,689 E | 10/1984 | Bulanda et al. | |
| 4,490,887 A | 1/1985 | Sarton et al. | |
| 4,580,319 A | 4/1986 | Paradis | |
| 4,658,478 A | 4/1987 | Paradis | |
| 4,754,529 A | 7/1988 | Paradis | |
| 4,866,816 A | 9/1989 | Caveney | |
| 5,088,159 A | 2/1992 | Lafleur | |
| 5,146,654 A | 9/1992 | Caveney et al. | |
| 5,295,285 A | 3/1994 | Shely | |
| 5,470,520 A | 11/1995 | Sorensen et al. | |
| 5,745,957 A | 5/1998 | Khokhar et al. | |

(Continued)

FOREIGN PATENT DOCUMENTS

FR 2 389 024 11/1978

(Continued)

OTHER PUBLICATIONS

European Search Report, including Annex, attached to European Patent Office Communication dated Mar. 29, 2005 (4 pages).

*Primary Examiner*—Robert J. Sandy
(74) *Attorney, Agent, or Firm*—Hoffmann & Baron, LLP

(57) ABSTRACT

A high performance cable tie includes an elongate strap, and a head extending from one end of the strap. The strap and pawl teeth each have convex portions which engage one another during insertion of the strap through the head. The strap and pawl teeth also each have planar portions which engage one another to obstruct retraction of the strap from the head. The longitudinal spacing of the strap and pawl teeth are equivalent. The surface of the pawl between the exit end of the passageway and the pawl tooth nearest thereto has a concave portion which engages the convex portion of the opposing strap tooth when the pawl pivots in response to retraction of the strap from the head. This pivoting of the pawl is limited by a heel which engages an inner surface of the head.

11 Claims, 6 Drawing Sheets

U.S. PATENT DOCUMENTS 6,751,828 B1 * 6/2004 Matschiner et al. ...... 24/16 PB
6,807,714 B1 * 10/2004 O'Young et al. ......... 24/16 PB
2004/0049890 A1 * 3/2004 Kurmis ..................... 24/16 PB

FOREIGN PATENT DOCUMENTS

GB        1 402 122        8/1975

* cited by examiner

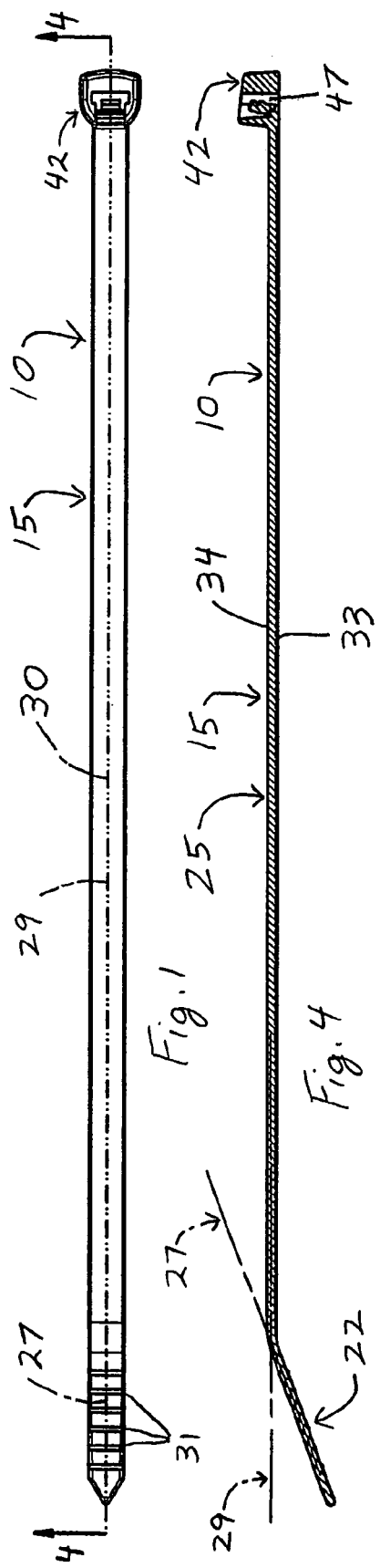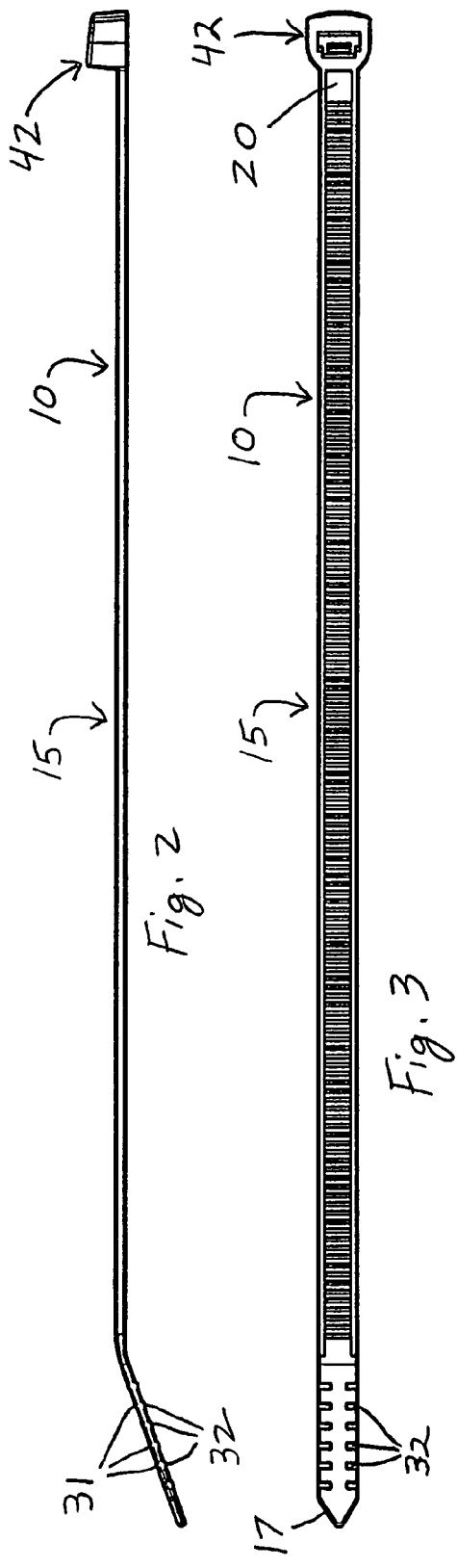

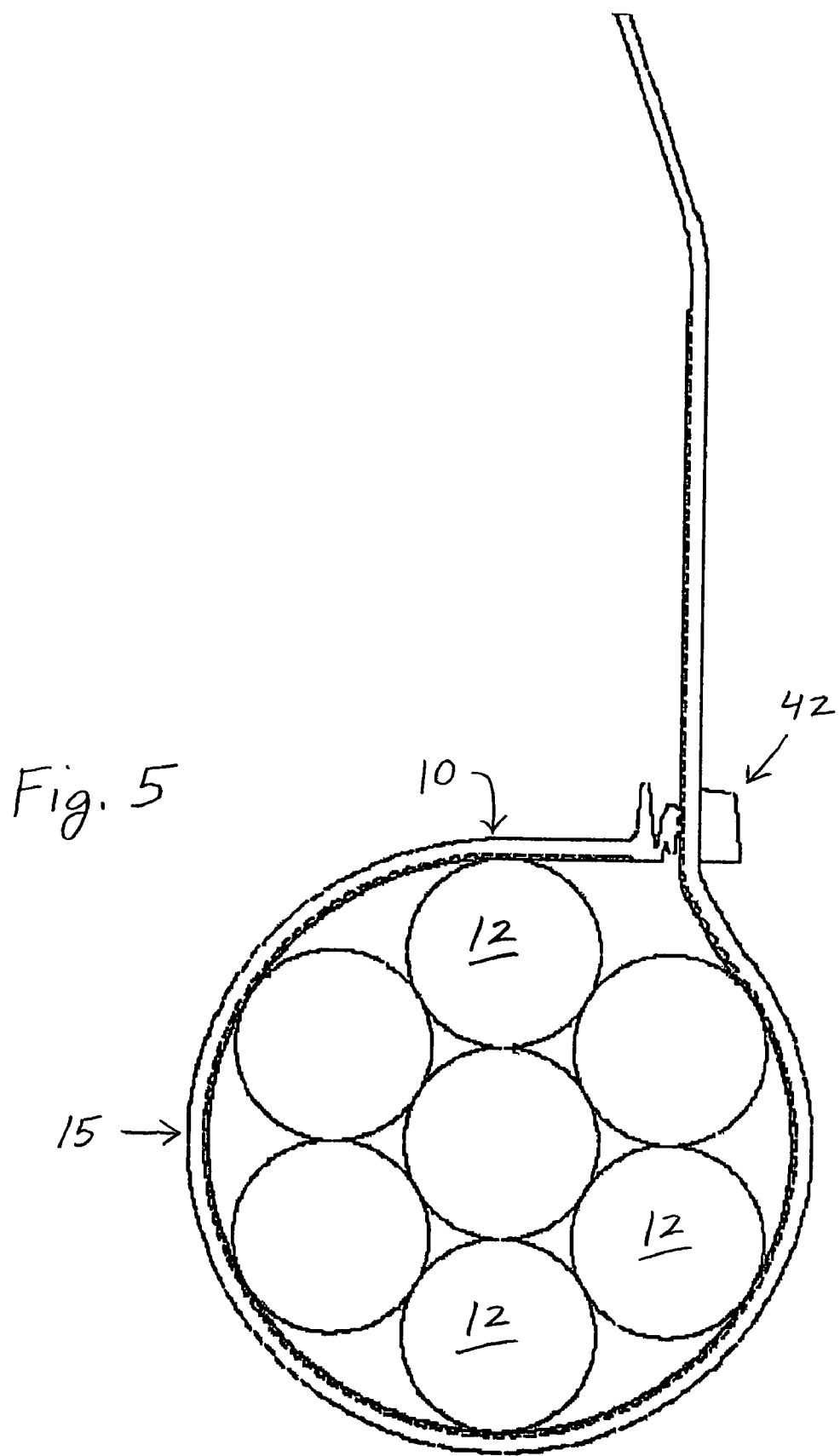

HIGH PERFORMANCE CABLE TIE

BACKGROUND OF THE INVENTION

The present invention relates generally to a cable tie, and more specifically, to a cable tie having a strap and a head which cooperate to facilitate insertion of the strap into the head and retention therein of the strap.

Cable ties are used to bundle or secure a group of articles such as electrical wires or cables. Cable ties of conventional construction include a cable tie head and an elongate strap extending therefrom. The strap is wrapped around a bundle of articles and thereafter inserted through a passageway in the head. The head of the cable tie typically supports a locking element which extends into the passageway allowing the strap to be inserted through the passageway but preventing retraction of the strap therethrough. Two longitudinally separated portions of the strap are thereby secured to the head to form a portion of the strap into a loop for bundling together the group of articles.

In use, the installer manually places the tie about the articles to be bundled, inserts the strap through the passageway head, and manually tightens the tie around the bundle. Further tightening of the cable tie, which increases the tension in the strap thereof, may be provided by a cable tie tool.

When the free end of the strap is inserted through the passageway of the head of a cable tie, such insertion may encounter resistance from the internal structure of the head. This is typically undesirable for various reasons among which is the fatigue of the user which may result from the installation of many cable ties. Installation of large numbers of cable ties is common. Also, the user may need to use both hands to simultaneously bundle together the elongate articles and apply the cable tie thereto by inserting the strap through the passageway in the head. Such insertion of the strap may be difficult if resisted by the internal structure of the head, particularly if the user is attempting to simultaneously hold together the bundle of articles.

Additionally, a cable tie typically requires a substantial force to retract the strap through the passageway in the head. However, as described in the foregoing, minimal resistance to insertion of the strap is desirable. Providing the head with a mechanism having such a selective resistance to travel of the strap through the passageway has proven to be difficult. This difficulty is increased by the relatively small size of the passageway in the head within which the mechanism is supported, and the requirement that the mechanism allow sufficient space in the passageway for the strap to travel therethrough.

SUMMARY OF THE INVENTION

The high performance cable tie of the present invention relates to a cable tie having a strap which is held within a head by teeth and a pawl which are shaped to facilitate insertion of the strap into the head and retention therein of the strap.

A high performance cable tie of the present invention includes an elongate strap, and a head extending from one end of the strap. The head has a passageway through which the free end of the strap is inserted such that a portion of the strap is formed into a loop for transversely encircling a group of elongate articles. The strap is translated through the passageway to reduce the area enclosed by the looped strap thereby to tightly bundle the articles. Retraction of the strap through the passageway is obstructed by the engagement of transverse strap teeth formed on one surface of the strap and transverse pawl teeth extending from a pawl flexibly attached to the interior of the head.

The strap and pawl teeth each have convex portions which engage one another during insertion of the strap through the passageway of the head. This engagement results in the respective convex portions tangentially contacting and sliding against one another. Such sliding contact results in frictional resistance to such insertion of the strap through the passageway. Such frictional resistance is reduced by the tangential contact which provides for a limited contact surface area between the convex portions.

The strap and pawl teeth each have planar portions which engage one another to obstruct retraction of the strap from the head. The longitudinal spacing of the strap and pawl teeth are equivalent providing for the engagement of multiple pairs of strap and pawl teeth to resist retraction of the strap from the head. This resistance to retraction of the strap from the head is thereby provided by an increased number of teeth thereby increasing the resistive force.

The surface of the pawl between the exit end of the passageway and the pawl tooth nearest thereto has a concave portion which engages the convex portion of the opposing strap tooth when the pawl pivots in response to retraction of the strap from the head. This engagement between the concave and convex portions forces the strap against the side of the passageway increasing the frictional force which resists sliding of the strap against the side of the passageway. This increased frictional force provides increased resistance to retraction of the strap from the head since such retraction normally entails sliding of the strap against the side of the passageway.

The pivoting of the pawl resulting from retraction of the strap from the head is limited by a heel which engages an inner surface of the head. This engagement of the heel maintains the pivoting of the pawl within the range of angular displacement typically provided by the flexibility of materials normally used for cable ties.

These and other features of the invention will be more fully understood from the following description of specific embodiments of the invention taken together with the accompanying drawings.

BRIEF DESCRIPTION OF THE DRAWINGS

In the drawings:

FIG. 1 is a top plan view of the cable tie of the present invention showing the head and strap;

FIG. 2 is a side elevation view of the cable tie of FIG. 1;

FIG. 3 is a bottom plan view of the cable tie of FIG. 1 showing the teeth on the strap;

FIG. 4 is a cross-sectional view in the plane indicated by the line 4—4 of FIG. 1 showing the teeth on both the strap and pawl;

FIG. 5 is a cross-sectional view in the plane indicated by line 5—5 of FIG. 1 showing the cable tie bundled around a group of elongate articles, the pawl being shown in the initial locking position;

Corresponding reference characters indicate corresponding parts throughout the several views of the drawings.

DETAILED DESCRIPTION OF THE INVENTION

Figure 6:
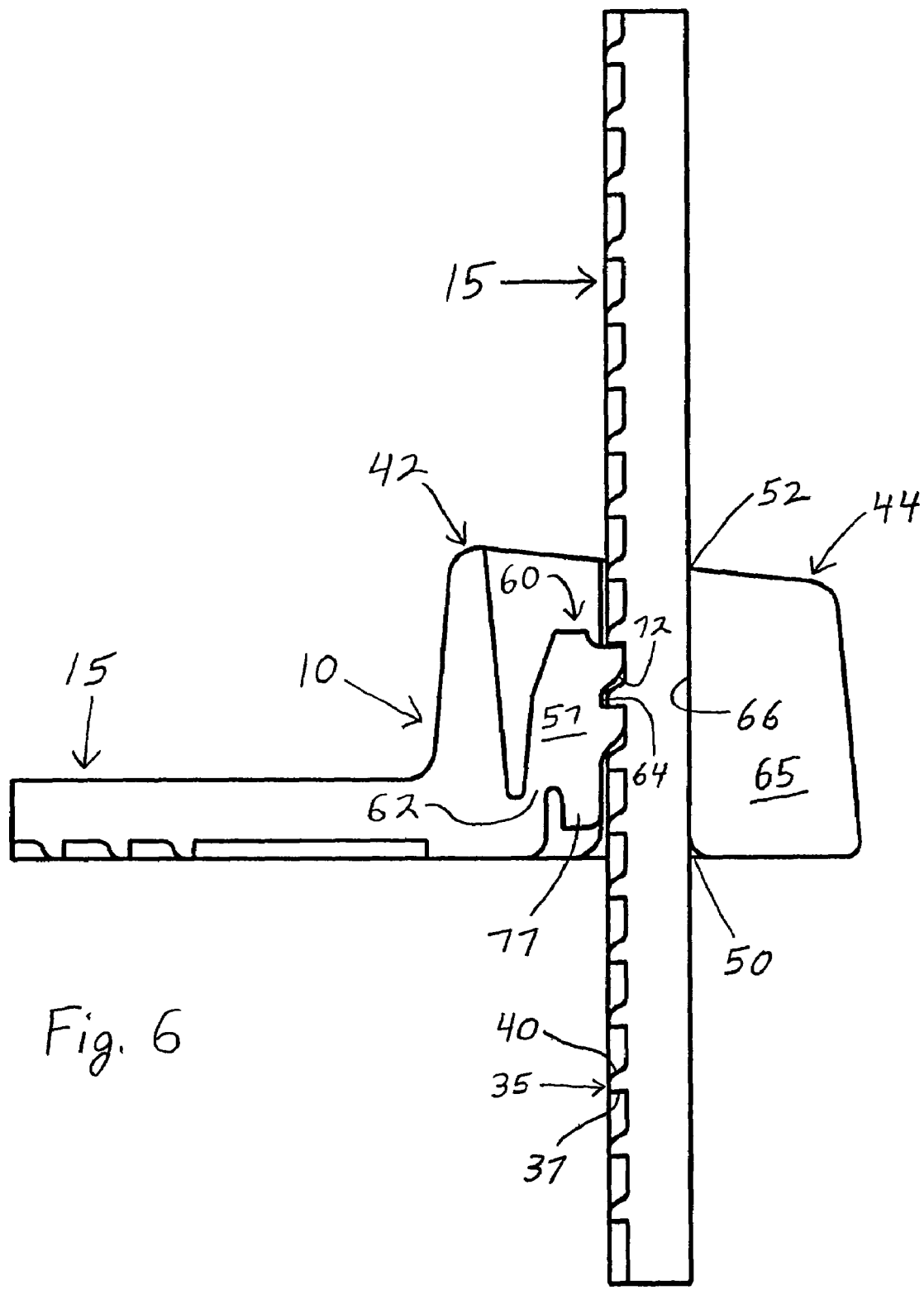
FIG. 6 is an enlarged view of a portion of FIG. 5 showing the head and portions of the strap, the pawl being shown in the initial locking position.

Referring to the drawings and more particularly to FIGS. 1 to 5, a high performance cable tie 10 is shown for bundling a collection of elongate articles 12, such as wires or cables.

The cable tie 10 includes an elongate strap 15 having opposing free and base ends 17, 20. The strap 15 has a tail portion 22 which is contiguous with the free end 17, and a toothed portion 25 which is contiguous with the base end 20. The tail and toothed portions 22, 25 have respective longitudinal central axes 27, 29 and are oriented such that the axes 27, 29 are contained in a central plane 30. The toothed portion 25, and in a possible embodiment the tail portion 22, is deformable transversely such that the respective axes 27, 29 are contained in the central plane 30. When the strap 15 is not deformed, the respective central axes 27, 29 of the tail and toothed portions 22, 25 are inclined relative to one another, as shown in FIGS. 2 and 4.

The tail portion 22 has, on opposing surfaces thereof, transverse protrusions 31, 32, shown in FIGS. 1 and 3, to provide an uneven surface to facilitate gripping thereof, typically between thumb and index of hand of user.

The toothed portion 25 has opposing primary and secondary grip surfaces 33, 34. A number of transverse strap teeth 35 each extend from the primary grip surface 33. The number of strap teeth 35 may vary from as few as a single strap tooth to many such strap teeth. Each strap tooth 35 has a transverse cross-section bounded by an outer periphery having a planar portion 37 which is perpendicular to the adjoining portion of the primary grip surface 33. The outer periphery of each strap tooth 35 further has a convex portion 40 in the shape of a quarter-circle. The strap teeth 35 each have equivalent, and preferable the same, shapes and sizes. The strap teeth 35 are separated from one another such that adjacent pairs of planar portions 37 are separated by equivalent distances, which are preferably the same, in the direction which is perpendicular to the planar portions.

The cable tie 10 includes an integral, one-piece head 42 having a base 44 extending from the base end 20 of the strap 15 such that the planar portions 37 of the strap teeth 35 face the base 44. The head 42 has a passageway 47 with opposed entry and exit ends 50, 52 such that the strap 15 can be inserted into the passageway through the entry end and exit the passageway through the exit end. The passageway 47 has a longitudinal central axis 55 which is contained in the central plane 30.

The head 42 has a pawl 57 which is flexibly connected to an inner surface of a primary portion 45 of the base 44 such that the pawl is adjacent to the passageway 47. The pawl 57 is positioned relative to the passageway 47 such that the pawl faces the strap teeth 35 when the strap 15, without being twisted about the central axes 27, 29, is deformed transversely such that a portion of the strap is formed into a loop and the free end 17 is inserted into the passageway through the entry end 50. The lack of twisting of the strap 15 results in the entire portion of the primary grip surface 33 between the base end 20 and exit end 52 being perpendicular to the central plane 30. Alternatively, the strap 15 could be twisted about the central axes 27, 29 the correct number of turns such that the strap teeth 35 within the passageway 47 face the pawl teeth 67.

Figure 7:
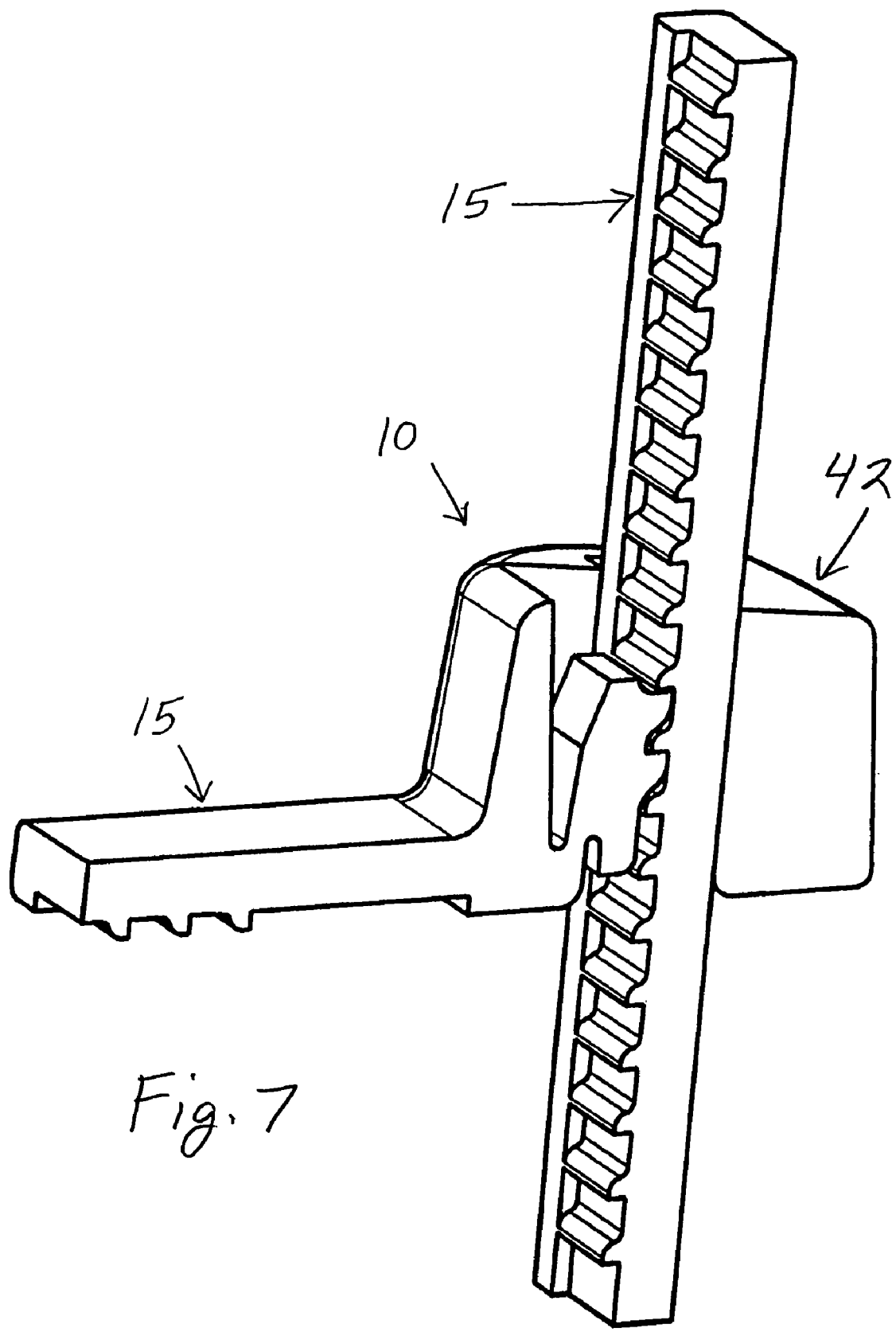
FIG. 7 is a an enlarged perspective view of the head and portions of the strap of FIG. 6 showing the pawl in the initial locking position.
Figure 8:
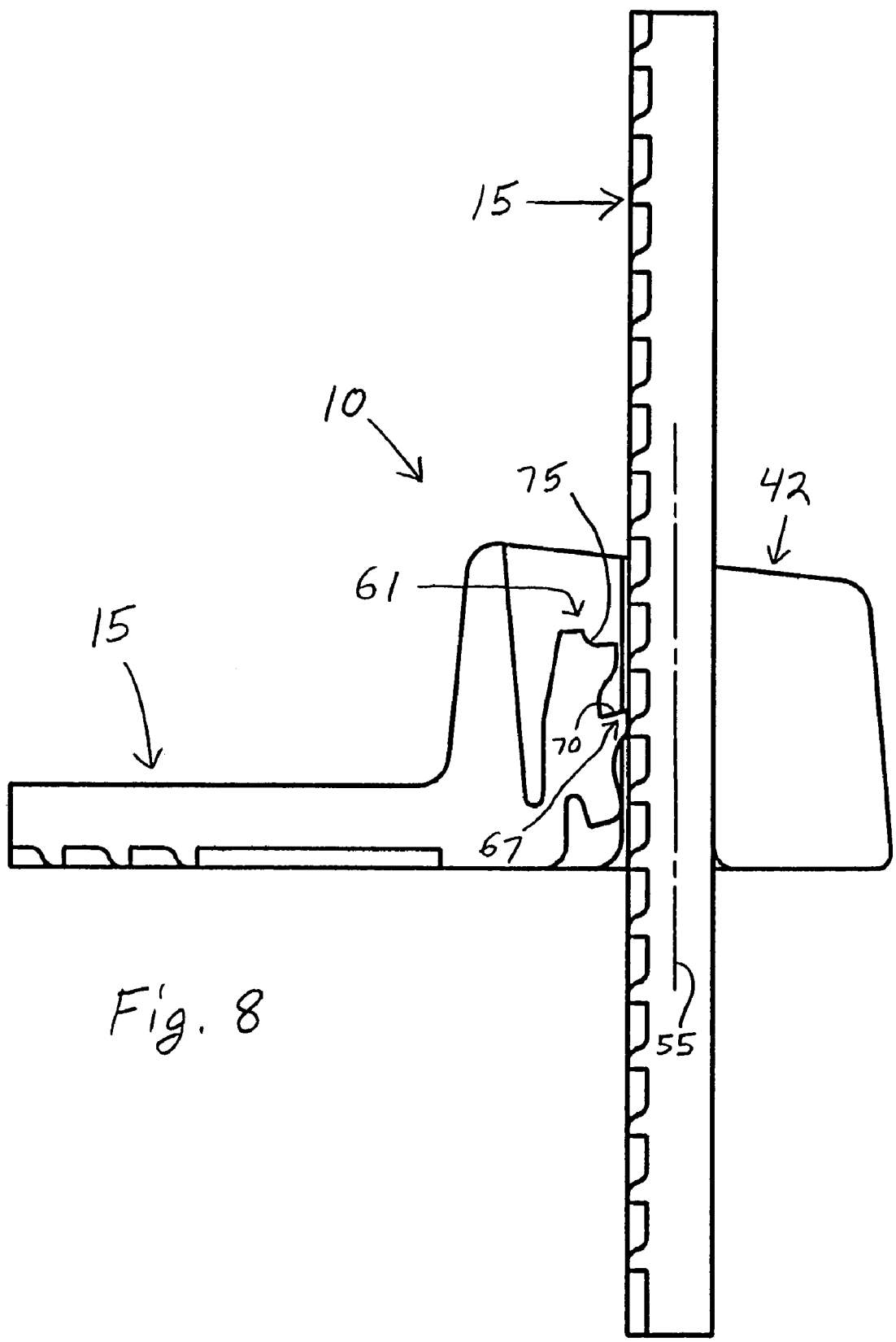
FIG. 8 is a view of the head and portions of the strap of the cable tie of the present invention, the view corresponding to that of FIG. 7 except that the pawl is shown in the insertion position.

The pawl 57 is biased to an initial locking position 60, shown in FIGS. 6 and 7, and is movable therefrom to a insertion position 61, shown in FIG. 8. The movement of the pawl 57 is provided by a neck portion 62 having a reduced cross-sectional area which connects the pawl 57 to the primary portion 45 of the base 44. The neck portion 62 results in the movement of the pawl 57 being pivoting thereof about a transverse axis through the neck portion. The biasing is provided by the material of the head 42 being sufficiently resilient.

Figure 9:
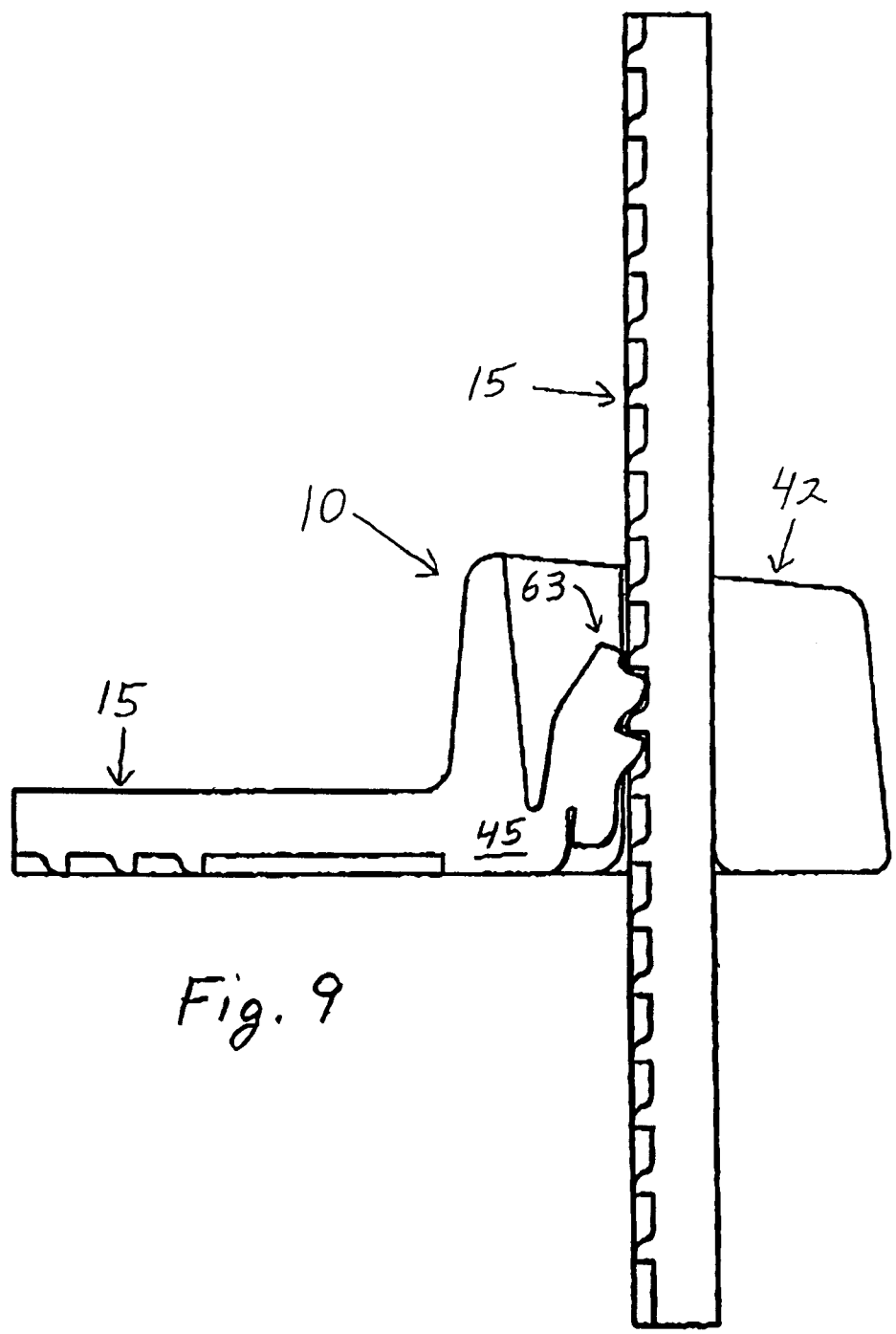
FIG. 9 is a view of the head and portions of the strap of the cable tie of the present invention, the view corresponding to that of FIG. 7 except that the pawl is shown in the supplemental locking position.

The pawl 57 is movable further from the initial locking position 60 to an supplemental locking position 63, shown in FIG. 9, and is biased for such movement thereto from the initial locking position. This movement of the pawl 57 is provided by pivoting thereof about a transverse axis through the neck portion 62. The biasing is provided by the material of the head 42 being sufficiently resilient.

The pawl 57 has a grip surface 64 which defines a portion of a side of the passageway 47. The base 44 has a secondary portion 65 with an inner support surface 66 which defines a side of the passageway 47 which opposes the side thereof defined by the grip surface 64.

A pair of pawl teeth 67 extend from the grip surface 64 such that each pawl tooth extends into the passageway 47 when the pawl is in the initial locking position 60. Each pawl tooth 67 is removed from the passageway 47 when the pawl 57 is in the insertion position 61. The number of pawl teeth 67 may vary from as few as a single pawl tooth to many such pawl teeth.

Each pawl tooth 67 has a transverse cross-section bounded by an outer periphery having a planar portion 70 which is perpendicular to the central axis 55 of the passageway 47 when the pawl 57 is in the initial locking position 60. The outer periphery of each pawl tooth 67 further has a convex portion 72 in the shape of a portion of a sine wave. The pawl teeth 67 each have equivalent, and preferably the same, shapes and sizes.

Each pawl tooth 67 is oriented relative to the passageway 47 such that the planar portion 70 of the pawl tooth faces the exit end 52 when the pawl 57 is in the initial locking position 60. The pawl teeth 67 are separated from one another such that the distance between the planar portions 70 in the direction which is perpendicular to the planar portions 70 is equivalent to, and preferably the same as, the distances between adjacent pairs of the planar portions 37 of the strap teeth 35.

The grip surface 64 has a concave portion 75 between the planar portion 70 of the pawl tooth 67 nearest to the exit end 52, and the exit end. The concave portion 75 has a curvature which corresponds to a curvature of the convex portions 40 of the strap teeth 35.

The pawl 57 has a heel 77 a portion of which moves into engagement with the primary portion 45 of the base 44 when the pawl is moved from the initial to supplemental locking positions 60, 63 to obstruct the movement of the pawl beyond the supplemental locking position.

The cable tie 10 is used to bundle a group of elongate articles by initially arranging the articles in generally parallel relation to each other with limited transverse clearance therebetween. The strap 15 is then oriented transversely around the bundle and wrapped around the articles to deform the strap transversely such that a portion of the strap is formed into a loop and the central axes 27, 29 of the strap 15 are contained in the central plane 30. The strap 15 is preferably not twisted about the central axes 27, 29.

The free end 17 of the strap 15 is positioned near the entry end 50 of the passageway 47 in the head 42 such that the primary grip surface 32 and the grip surface 64 of the pawl 57 are in opposed relation to one another. The free end 17 of the strap 15 is inserted through the entry end 50 into the passageway 47 such that the respective central axes 29, 55 generally coincide.

Sufficient insertion of the strap 15 through the passageway 47 results in the free end 17 exiting the exit end 52. The transverse protrusions 31, 32 thereby become accessible for gripping by the user to further pull the strap 15 through the passageway 47 toward the exit end 52 thereof to reduce the size of the looped portion of the strap which encircles the bundle of articles for tightening thereof.

The insertion is continued sufficiently such that the convex portion 40 of the strap tooth 35 nearest to the free end 17 engages the convex portion 72 of the pawl tooth 67 nearest to the entry end 50. The contact between the surfaces of the convex portions 40, 72 is tangential due to the respective curvatures of the convex portions 40, 72. Accordingly, the surface areas of the convex portions 40, 72 which contact each other are elongate and generally transverse to the central plane 30.

Continued insertion of the strap 15 into the passageway 47 results in the respective convex portions 40, 72 of the strap tooth 35 and pawl tooth 67 sliding against one another. Such sliding contact results in frictional resistance to such insertion of the strap 15 into the passageway 47. Such frictional resistance is limited by the tangential contact between the convex portions 40, 72 which provides for a limited contact surface area therebetween.

Further insertion of the strap 15 into the passageway 47 causes pivotal movement of the pawl 57 about the connection of the pawl to the primary portion 45 of the base 44. If such insertion of the strap 15 is sufficient, the pawl 57 will be pivoted to the insertion position 61 in which the planar portion 37 of the strap tooth 35 is longitudinally positioned between the planar portion 70 of the pawl tooth 67 and the exit end 52 of the passageway 47. The biasing then pivotally returns the pawl 57 to the initial locking position 60 in which the respective planar portions 37, 70 of the strap tooth 35 and pawl tooth 67 abut one another to obstruct retraction of the strap 15 through the passageway 47 in a direction toward the entry end 50.

The strap 15 may be further inserted through the passageway 47 in the direction toward the exit end 52 such that the respective central axes 27, 55 continue to generally coincide. Such continued insertion will result longitudinal translation of the strap teeth 35 through the passageway 47 and the engagement between the convex portion 40 of the strap tooth 35 nearest to the free end 17 of the strap 15 with the convex portion 72 of the pawl tooth 67 nearest to the exit end 52. Concurrent with this engagement is the engagement of the convex portion 40 of the next strap tooth 35 with the convex portion 72 of the pawl tooth 67 nearest to the entry end 50. Further insertion of the strap 15 will result in the pivoting of the pawl 57 to the insertion position 61, pivoting return thereof to the initial locking position 60, and the abutment of the corresponding planar portions 37, 70 of the strap and pawl teeth 35, 67 in the manner described herein in the foregoing for the engagement between the strap tooth 35 nearest to the free end 17 and the pawl tooth 67 nearest to the entry end 50.

The strap 15 may be inserted still further into the passageway 47 toward the exit end 52. Such further insertion of the strap 15 will result in the successive engagement of adjacent pairs of the convex portions 40 of corresponding strap teeth 35 with the convex portions 72 of the corresponding pawl teeth 67. This will be followed by the pivoting of the pawl 57 to the insertion position 61, pivoting return thereof to the initial locking position 60, and the abutment of the corresponding planar portions 37, 70 of the strap and pawl teeth 35, 67 in the manner described herein in the foregoing for the initial engagement between a pair of strap and a pair of pawl teeth. Such further insertion of the strap 15 into the passageway 47 will also result in the looped portion of the strap, which bundles the elongate articles, becoming smaller thereby tightening the cable tie 10 around the articles. Additionally, further insertion of the strap 15 into the passageway 47 will result in the exit therefrom of the free end 17 through the exit end 52.

The engagement between the respective planar portions 37, 70 of the strap and pawl teeth 35, 67 obstruct retraction of the strap 15 through the passageway 47 in the direction toward the exit end 52. This obstruction is facilitated by the equivalent longitudinal spacing of the planar portions 37 of the strap teeth 35, and the planar portions of the pawl teeth 67. This equivalent longitudinal spacing provides for the concurrent engagement of the planar portion 70 of each pawl tooth 67 with a planar portion 37 of a strap tooth 35. Accordingly, obstruction to the retraction of the strap 15 is provided concurrently by two pairs of strap and pawl teeth 35, 67.

Further resistance to retraction of the strap 15 through the passageway 47 is provided by pivotal movement of the pawl 57 from the initial to supplemental locking positions 60, 63. This movement of the pawl 57 to the supplemental locking position 63 results from application of a retraction force to the strap 15 which longitudinally draws the strap teeth 35 and abutting pawl teeth 67 toward the exit end 52. This causes the pawl 57 to correspondingly pivot about the transverse axis through the neck portion 62 resulting in the convex portions 72 of the pawl teeth 67 and the concave portion 75 of the pawl 57 forcibly engaging the convex portion 40 of the opposing strap tooth 35. This causes the secondary grip surface 34 of the strap 15 to forcibly engage the support surface 66 of the head 42 which creates frictional resistance to longitudinal displacement of the tail relative to the support surface resulting in further obstruction to retraction of the tail from the head.

The engagement between the concave and convex portions 40, 72 increases the contact surface area between the pawl 57 and primary grip surface 32 of the strap 15. This facilitates a more square seating of the secondary grip surface 34 on the support surface 66 and perpendicular orientation relative thereto of the force which directs the strap 15 against the support surface. This provides for a nearly maximum force directing the secondary grip surface 34 against the support surface 66 which results in a nearly maximum frictional force therebetween which resists displacement between the secondary grip surface and support surface.

The pivoting of the pawl 57 from the initial locking position 60 toward the supplemental locking position 63 causes the heel 77 of the pawl 57 to move toward the primary portion 45 of the base 44. When the pawl 57 reaches the supplemental locking position 63, a portion of the heel 77 engages the primary portion 45 of the base 44 which obstructs further pivoting of the pawl 57 beyond the supplemental locking position 63.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. A cable tie for bundling elongate articles, said cable tie comprising:

an elongate strap having opposing free and base ends, said strap further having a longitudinal central axis and being deformable into a loop such that said central axis is contained in a central plane, said strap having a primary grip surface and a transverse strap tooth which extends therefrom, said strap tooth having a transverse cross-section bounded by an outer periphery having a planar portion which is perpendicular to an adjoining portion of said primary grip surface, said outer periphery of said strap tooth further having a convex portion; and a head having a base extending from said base end of said strap such that said planar portion of said strap tooth faces said head, said head having a passageway with opposed entry and exit ends such that said free end of said strap can be inserted into said passageway through said entry end and exit said passageway through said exit end, said passageway having a longitudinal central axis which is contained in said central plane, said head having a pawl which is flexibly connected to an inner surface of said base such that said pawl is adjacent to said passageway, said pawl being biased to an initial locking position and movable therefrom to an insertion position, said pawl having a grip surface and a pawl tooth which extends therefrom such that said pawl tooth extends into said passageway when said pawl is in said initial locking position, said pawl being removed from said passageway when said pawl is in said insertion position, said pawl tooth having a transverse cross-section bounded by an outer periphery having a planar portion which is perpendicular to said central axis of said passageway when said pawl is in said initial locking position, said outer periphery of said pawl tooth further having a convex portion, said pawl tooth being oriented relative to said passageway such that said planar portion of said pawl tooth faces said exit end when said pawl is in said initial locking position, said pawl being oriented relative to said passageway such that, when said strap is sufficiently inserted therein through said entry end, said convex portion of said strap tooth engages said convex portion of said pawl tooth, sufficient further insertion of said strap into said passageway causing movement of said pawl to said insertion position wherein said planar portion of said strap tooth is longitudinally positioned between said planar portion of said pawl tooth and said exit end of said passageway such that said biasing returns said pawl to said initial locking position wherein said planar portions of said strap tooth and pawl tooth abut one another to obstruct retraction of said strap through said passageway in a direction toward said entry end.

2. A cable tie according to claim 1, wherein said periphery of said convex portion of said strap tooth has the shape of a quarter-circle.

3. A cable tie according to claim 1, wherein said periphery of said convex portion of said pawl tooth has the shape of a portion of a sine wave.

4. A cable tie according to claim 1, wherein said strap and pawl teeth constitute first strap and pawl teeth, respectively, said adjoining portion of said primary grip surface constituting a first adjoining portion, said cable tie further comprising a second strap tooth which extends from said primary grip surface, said second strap tooth having a transverse cross-section bounded by an outer periphery having a planar portion which is perpendicular to a second adjoining portion of said primary grip surface, said outer periphery of said second strap tooth further having a convex portion, said second strap tooth being oriented relative to said strap such that said planar portion of said second strap tooth faces said head, said cable tie further comprising a second pawl tooth which extends from said grip surface of said pawl such that said second pawl tooth extends into said passageway when said pawl is in said initial locking position, said second pawl tooth being removed from said passageway when said pawl is in said insertion position, said second pawl tooth having a transverse cross-section bounded by an outer periphery having a planar portion which is perpendicular to said central axis of said passageway when said pawl is in said initial locking position, said outer periphery of said second pawl tooth further having a convex portion, said second pawl tooth being oriented relative to said passageway such that said planar portion of said second pawl tooth faces said exit end when said pawl is in said initial locking position, said planar portions of said first and second pawl teeth being separated from one another in the direction which is perpendicular to said planar portions thereof by a distance which is equivalent to the distance between said planar portions of said first and second strap teeth in the direction which is perpendicular to said planar portions thereof.

5. A cable tie according to claim 1, and further comprising a plurality of strap teeth each of which extends from said primary grip surface, said strap teeth each having a transverse cross-section bounded by an outer periphery having a planar portion which is perpendicular to an adjoining portion of said primary grip surface, said outer periphery of said strap teeth each further having a convex portion, said strap teeth each being oriented relative to said strap such that said planar portions of said strap teeth each face said head, said planar portions of adjacent pairs of said strap teeth being separated from one another in the direction which is perpendicular to said planar portions thereof by an equivalent distance.

6. A cable tie according to claim 1, wherein said movement of said pawl between said initial locking position and said insertion position is by pivoting of said pawl about said flexible connection of said pawl to said base.

7. A cable tie according to claim 1, wherein said strap is oriented relative to said head such that, when said strap is inserted into said passageway, the entire portion of said primary grip surface between said base end and said exit end is perpendicular to said central plane.

8. A cable tie for bundling elongate articles, said cable tie comprising:

an elongate strap having opposing free and base ends, said strap further having a longitudinal central axis and being deformable into a loop such that said central axis is contained in a central plane, said strap having a primary grip surface and a transverse strap tooth which extends therefrom, said strap tooth having a transverse cross-section bounded by an outer periphery having a planar portion which is perpendicular to an adjoining portion of said primary grip surface, said outer periphery of said strap tooth further having a convex portion, said strap having a secondary grip surface opposite from said primary grip surface; and a head having a base extending from said base end of said strap such that said planar portion of said strap tooth faces said head, said head having a passageway with opposed entry and exit ends such that said free end of said strap can be inserted into said passageway through said entry end and exit said passageway through said exit end, said passageway having a longitudinal central axis which is contained in said central plane, said head having a pawl which is flexibly connected to an inner surface of said base such that said pawl is adjacent to said passageway, said pawl being biased to an initial locking position and movable therefrom to a supplemental locking position, said pawl being further biased thereto from said initial locking position, said pawl having a grip surface and a pawl tooth which extends from said grip surface of said pawl such that said pawl tooth extends into said passageway when said pawl is in said initial and supplemental locking positions, said pawl being removed from said passageway when said pawl is in said insertion position, said pawl tooth having a transverse cross-section bounded by an outer periphery having a planar portion which is perpendicular to said central axis of said passageway when said pawl is in said initial locking position, said pawl tooth being oriented relative to said passageway such that said planar portion of said pawl tooth faces said exit end when said pawl is in said initial locking position, said grip surface of said pawl having a concave portion between said planar portion of said pawl tooth and said exit end, said head having a planar support surface which defines a side of said passageway which opposes said pawl such that, when said strap is sufficiently inserted into said passageway through said entry end, said pawl is biased to said supplemental locking position wherein said concave portion of said grip surface of said pawl forcibly engages said convex portion of said primary grip surface of said strap such that said secondary grip surface of said strap is urged into engagement with said support surface to provide functional resistance to said retraction of said strap.

9. A cable tie according to claim 8, wherein said concave portion of said pawl has a curvature which corresponds to a curvature of said convex portion of said strap tooth.

10. A cable tie according to claim 8, wherein said secondary grip surface of said strap has a planar portion for said engagement with said support surface when said pawl is biased to said supplemental locking position to forcibly engage said strap.

11. A cable tie according to claim 8, wherein said movement of said pawl from said initial locking position to said supplemental locking position is by pivoting of said pawl about said flexible connection of said pawl to said base.

* * * * *